United States Patent [19]

Obstfelder et al.

[11] Patent Number: 4,726,453

[45] Date of Patent: Feb. 23, 1988

[54] SELF-ADJUSTING SINGLE- OR TWIN-TUBE SHOCK ABSORBER

[75] Inventors: Günther Obstfelder, Weinheim-Lützelsachsen; Gerhard Kreutze, Neckarsteinach; Winfried Lüttig, Heiligkreuzsteinach, all of Fed. Rep. of Germany

[73] Assignee: F & O Elektronik Systems GmbH & Co., Neckarsteinach, Fed. Rep. of Germany

[21] Appl. No.: 894,395

[22] Filed: Aug. 12, 1986

Related U.S. Application Data

[63] Continuation of Ser. No. 599,242, Apr. 11, 1984, abandoned.

[30] Foreign Application Priority Data

Apr. 11, 1983 [DE] Fed. Rep. of Germany ....... 3312899
Apr. 11, 1983 [DE] Fed. Rep. of Germany ....... 3312881
Dec. 22, 1983 [DE] Fed. Rep. of Germany ....... 3346352

[51] Int. Cl.⁴ .................. F16F 9/50; F16F 9/52; F16F 9/34
[52] U.S. Cl. .................. 188/319; 137/625.35; 137/625.38; 188/299; 251/129.09; 251/129.1; 280/707; 280/714; 330/6
[58] Field of Search .......... 188/319, 285, 299, 322.15; 137/625.35, 625.38; 251/129.09, 129.1, 129.22; 330/6; 280/707, 714

[56] References Cited

U.S. PATENT DOCUMENTS

| | | | |
|---|---|---|---|
| 3,514,071 | 5/1970 | Moffatt | 137/625.38 X |
| 3,524,634 | 8/1970 | Schmidt | 280/707 X |
| 3,603,612 | 9/1971 | Hill et al. | 188/299 X |
| 3,625,477 | 12/1971 | Vogel | 251/129.1 |
| 3,693,767 | 9/1972 | Johnson | 188/287 X |
| 4,054,295 | 10/1977 | Elliott | 280/707 X |
| 4,254,935 | 3/1981 | Jarrett | 251/129.1 |
| 4,310,172 | 1/1982 | Claude | 280/707 X |
| 4,313,529 | 2/1982 | Kato et al. | 188/299 |
| 4,506,869 | 3/1985 | Masclet et al. | 188/299 X |
| 4,527,676 | 7/1985 | Emura et al. | 188/299 |

FOREIGN PATENT DOCUMENTS

| | | | |
|---|---|---|---|
| 226488 | 8/1962 | Austria | 251/129.1 |
| 2911768 | 1/1983 | Fed. Rep. of Germany | |
| 1095506 | 12/1954 | France | 188/322.15 |
| 57534 | 4/1983 | Japan | 188/299 |
| 664770 | 1/1952 | United Kingdom | 188/299 |
| 928997 | 6/1963 | United Kingdom | 251/129.1 |

Primary Examiner—George E. A. Halvosa
Attorney, Agent, or Firm—Peter K. Kontler

[57] ABSTRACT

A self-adjusting single- or twin-tube shock absorber having a cylinder closed at both ends and filled with at least one damping medium, a piston rod sealingly inserted into the cylinder, and a piston carried on the cylinder side end of the piston rod for dividing a cylinder spaced into two half chambers. The piston rod has a longitudinal bore formed therein and at least one orifice traversing the longitudinal bore for connecting the two half chambers. An electrically controlled distributing slide valve device for opening and closing the orifice includes a slide valve sleeve coaxially surrounding the piston rod and the orifice and movable on the piston rod for opening and closing the orifice. A step motor has a slide valve as a movable part thereof for stepwise adjusting the slide valve and a stator including a plurality of exciter coils and coil formers surrounding the slide valve sleeve and the piston rod. An electronic control circuit supplies electrical switching pulses to the step motor dependent upon data entered into the control circuit means for stepwise adjustment of the slide valve sleeve.

19 Claims, 9 Drawing Figures

SELF-ADJUSTING SINGLE- OR TWIN-TUBE SHOCK ABSORBER

This application is a continuation of application Ser. No. 599,242, filed Apr. 11, 1984, now abandoned.

SUMMARY OF THE INVENTION

The invention relates to a self-adjusting single- or twin-tube shock absorber, and more particularly such a shock absorber for motor vehicles.

An adjustable shock absorber is known from West German Pat. No. 29 11 768, particularly for motor vehicles, consisting of a cylinder filled with a damping fluid and a cylindrical toplid lapping over the cylinder and having a piston rod fitted concentrically and axially therein, dipping into the cylinder and carrying on its end portion a disk packed against the cylinder wall and dividing the cylinder space into two half chambers. The shock absorber also has unidirectional high- and low-pressure valves and a distributing slide valve fitted with allowance for sliding in an axial bore in the piston rod, spring-loaded in the axial direction and, in the rest and operating positions, closes an additional opening between the two half chambers. The distributing slide valve is placed in the axial direction on an armature which dips into an electrical coil arranged within the longitudinal bore in the upper portion of the piston rod and which has an electrical supply lead from outside the shock absorber. The cylinder also has at its upper end at least one permanent magnet. On the cylindrical inner wall of the toplid, moreover, there is provided at least one coil likewise provided with a supply lead from outside the shock absorber.

It has been demonstrated that with such a shock absorber system it is practically impossible to partially close the through-hole by means of the distributing slide valve as required, because the armature, together with the distributing slide valve, is so arranged as to move freely in the coil. Consequently, only the end positions of the distributing slide valve can be properly selected. Equally problematical is the tubular piston rod, because the piston rod of a shock absorber must meet special static conditions.

Therefore, the major object of the invention is to provide a self-adjusting shock absorber of the type mentioned above, which adjusts itself practically instantaneously and automatically to each momentary road condition, coincidentally with the shock absorber changing automatically its attenuation characteristic to meet the particular road condition, so that the damping medium between the piston and slide valve flows practically without pressure.

This object is accomplished according to the teachings of the invention by providing a shock absorber wherein a self-adjusting tube shock absorber, particularly suitable for motor vehicles comprising: (a) a cylinder closed at both ends and filled with at least one damping medium; (b) a piston rod sealingly inserted into the cylinder carried on the cylinder side end of the piston rod, optionally provided with high- and low-pressure valves, packaged against the cylinder wall and dividing the cylinder space into two half chambers, wherein the half chambers are connected by a longitudinal bore formed in the piston rod and at least one orifice traversing the longitudinal bore; (d) an electrically controlled distributing slide valve means for opening and closing the orifice including: (i) a slide-valve sleeve coaxially surrounding the piston rod in the area of the orifice and movable on the piston rod for opening and closing the orifice; (ii) a step motor having the slide valve as a movable part of a step motor for stepwise adjusting the slide valve, and a stator comprising a plurality of exciter coils and coil formers surrounding the slide valve sleeve and the piston rod fixedly therewith; and (iii) electronic control circuit means for supplying electrical switching pulses to the step motor dependent upon the data entered in the control circuit means for the stepwise adjustment of the slide-valve. Further practical embodiments of the invention are described hereafter.

The shock absorber incorporating the invention has the prominent advantage of automatically adjusting itself to any road condition practically instantaneously. For example, a shock absorber must harden during braking and acceleration, so the shock absorber of the invention adjusts instantaneously to these conditions.

Because of the adjustable damping, the shock absorber embodying the invention can pass through an entire family of curves, which is impossible with prior art shock absorbers. Furthermore, assemblies of equipment can advantageously be integrated within the cylinder of the absorber, including any acceleration sensor or device for measuring the wheel travel with respect to the vehicle body. Moreover, a number of limiting values can be stored in the regulation and control circuit, which regulates the shock absorber as required when these limiting values are reached.

Advantageously, by employing the shock absorber of the invention, it is possible to divide the closed position from the open position in as many increments as desired, resulting in a very precise regulation or control of the slide valve. Of decisive advantage is the fact that in this case it does not depend on the pattern flow prevailing after the damping medium has escaped from the orifices in the piston rod, because absolutely no force is transmitted by the damping medium between the piston rod and the slide valve. Therefore, the operation of the shock absorber of the invention is not influenced by the openings in the piston rod which allow the damping medium to pass therethrough at a higher or lower rate. Due to the design of this invention, the damping fluid no longer acts directly on the slide valve, nor is any force transmitted by the damping medium to the slide valve.

In principle, two basic designs are possible for the slide valve of this shock absorber, namely, a lifting or as a rotary valve. The design as a lifting valve has the additional advantage that the valve is a simple sleeve which, together with the other parts of the step motor, is easy to manufacture. More particularly, the design of the shock absorber of the invention with a lifting valve is distinguished by its extremely simple construction.

In the shock absorber of the invention, the slide valve having either basic design exhibits practically no inertia, because the slide valve, due to its limited net mass, can react practiclly without inertia to the regulation or control signals of the coil formers. Moreover, the position of the slide valve cannot be falsified because of heavy accelerations, since the slide valve is forcibly guided by strong electrical forces. Furthermore, no radial forces act on the slide valve during the simultaneous triggering of two opposed electromagnets mounted in pairs.

Preferably, in the shock absorber of the invention which is provided with a slide valve, the latter is formed as an internal rotor of the step motor. Nevertheless the rotary valve can also be built as an external rotor.

A distance-sensitive measuring signal can be generated most easily and effectively by means of a thread provided inside the inner cylinder wall, a capacitive or magnetic sensor that faces the thread being mounted on the piston rod.

BRIEF DESCRIPTION OF THE DRAWINGS

Two embodiments of the invention are depicted in the accompanying drawing, in which.

DETAILED DESCRIPTION OF THE PREFERRED EMBODIMENTS

Figure 1:
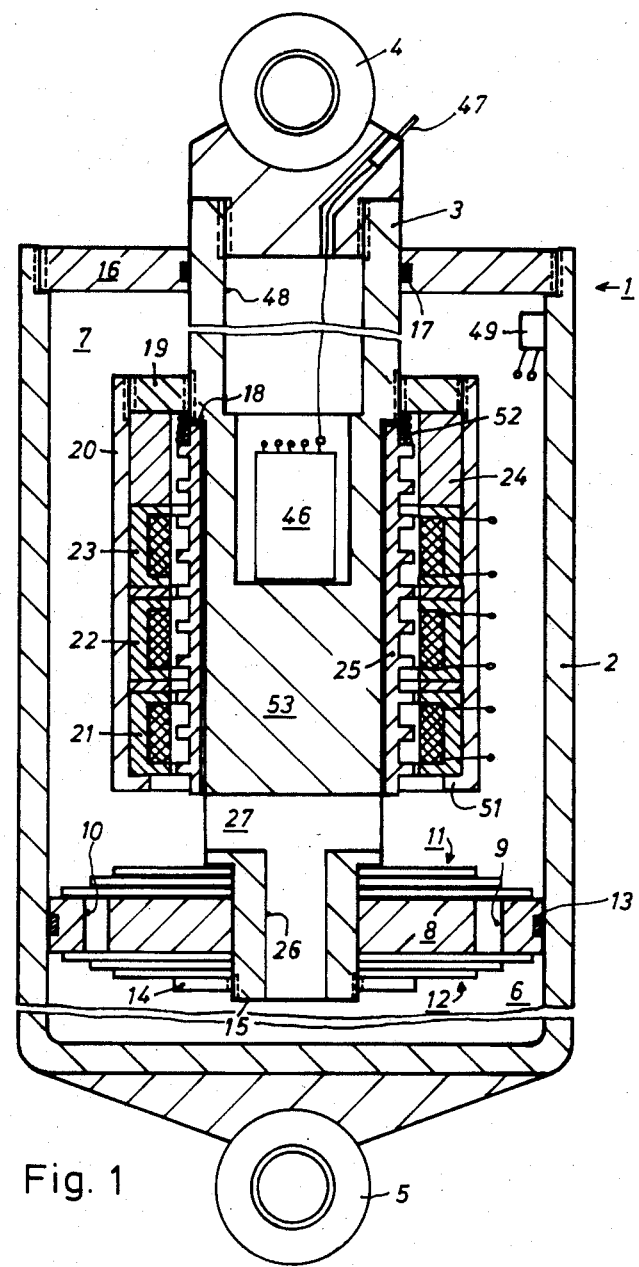
FIG. 1 is a cross-sectional view through a first embodiment of the invention of a single-tube shock absorber, showing the cylinder, the piston rod, the slide valve in form of a lifting valve, and the step motor.

As shown in FIG. 1, the adjustable shock absorber 1 is made up of a cylinder 2 closed at both ends and filled with at least one damping medium. The medium can either be a fluid and/or a gas. The upper end of the cylinder is closed by means of a cylinder cover 16 which, for example, is screwed into the cylinder. A piston rod 3 extends into the cylinder 2 through the cylinder cover 16, the passage being sealed against the piston rod by means of a ring seal 17. At the upper end of the piston rod and at the lower end of the cylinder there are provided respective holding fixtures 4 and 5 to fasten the shock absorber 1, one to the vehicle body and the other to the wheel or axle of the vehicle. Preferably, the piston rod 3 has a longitudinal bore 48 in which is located an electronic regulation or control circuit 46. The piston rod 3 has on its cylinder-side lower end 15 a piston 8 given the form of a disk known from the prior art. This piston 8 is fixedly connected to the piston rod 3 by means of a nut 14 screwed onto the lower end 15 of the piston rod.

The piston 8 can be a common piston such as known in the shock absorber art. The piston 8 has throughbores 9 and 10 which are shut off by means of compound springs 11 and 12. These springs can, for example, have different spring values, with the result that the piston 8 can form a high- and a low-pressure valve. The piston 8 divides the cylinder space into a lower half chamber 6 and an upper half chamber 7 which, in the embodiment depicted in FIG. 1, communicate with each other through the throughbores 9 and 10.

Starting from the front end of the piston rod 3, the lower end 15 of the piston rod has a longitudinal bore 26 which runs concentrically with the longitudinal axis of the piston rod 3 and extends through the piston 8. Perpendicular to this longitudinal bore 26, the piston rod 3 has above the piston 8 at least one orifice 27, which traverses the longitudinal bore 26 radially, the number of such orifices being optional. The bore shown in FIG. 1 is a cross bore 27 along a diameter of the piston rod 3. Thus, the bores 26 and 27 connect the half chambers 6 and 7 with each other. Therefore, if the piston 8 is employed with high- and low-pressure valves 9 and 10, as preferred, they also create a bypass made up of these bores 26 and 27.

On the piston rod 3, there is provided a slide valve 25 fitted such as to move freely upwards and downwards on the piston rod. To limit the upward travel of the slide valve in the direction of the cylinder cover 16, the piston rod 3 possesses a peripheral shoulder 18, so that the slide valve 25 runs only along the lower, smaller-diameter portion of the piston rod 3. Above the shoulder 18 on the piston rod 3, there is mounted a disk 19 which, for example, is screwed thereto. A sleeve 20, in turn, is provided on its upper end with an internal thread and is screwed onto the peripheral front wall of the disk 19. This sleeve 20 extends downwards into the area of the slide valve 25 roughly above the orifice 27 inside the piston rod 3. On its lower end turned toward the orifice 27, the sleeve 20 has a flanged edge 51.

Within this sleeve 20 there are disposed several toroidal coil formers 21, 22, 23 whose construction, together with the slide valve 25, will be described with reference to FIG. 2.

Figure 2:
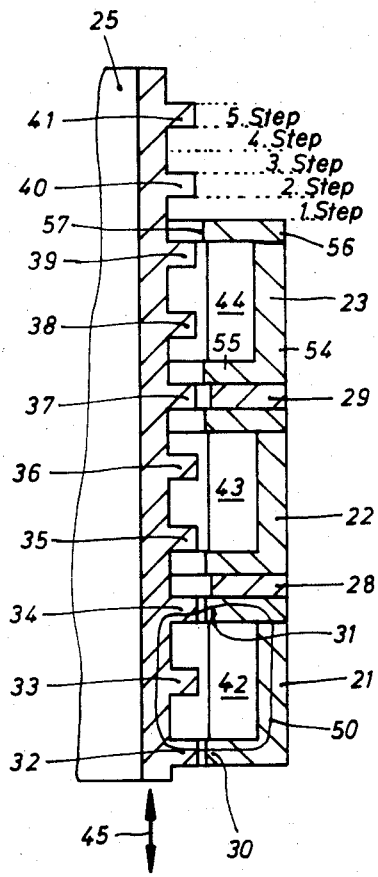
FIG. 2 is an enlarged, partial cross-sectional view showing the sleeve and the coil former with the exciter coils which, together, make up the step motor of the embodiment illustrated in FIG. 1.

As shown in FIG. 2, the slide valve 25 has a plurality of projecting rings 32, 33, 34, 35, 36, 37, 38, 39, 40, 41 spaced an equal distance from one another. Preferably, the slide valve 25 is made of magnetically soft material, e.g., soft iron. The groove-shaped interspace between every two rings can, for example, be filled up with plastic material (not shown) so that the front sides of all the rings, together with the peripheral annular areas of the plastic sheaths, form a closed circumferential surface of the slide valve.

Inside the sleeve 20 there are superimposed upon one anther the coil formers 21, 22, 23 which preferably surround the distributing slide valve 25 in an annular configuration. Each individual coil former 21, 22, 23 has two toroidal pole shoes 30 and 31 separated from each other by a space for receiving a respective exciter coil 42, 43, 44. Preferably, the coil former is also made of a magnetically soft material, e.g., soft iron. The coil formers are so arranged that the corresponding pole shoes face the rings 32-41 of the slide valve 25 in an annular configuration, but leaving a narrow air gap therebetween. The exciter coils 42, 43, 44 can be triggered one by one and are connected to the regulation or control circuit 46 by leads (not shown).

Preferably, a coil former is made up of a tubular cylinder 54 to which a bottom 55 is fitted integrally. The top side of the cylinder 54 is closed by a cover 56. The bottom 55 and the cover 56 each have a concentric bore whose diameter is smaller than the inside diameter of the cylinder 54. The exciter coil is located in the resulting inner annular space. The bottom 55 and the cover 56 form with their inner front-end narrow faces 57, respectively, the pole shoes 30, 31 of the coil former.

This system is set up in such a way that the coil formers, together with their exciter coils and the slide valve, form a step motor, more specifically, a linear motor, where the value of each step depends on the number of slide-valve rings, the number of pole shoes, and the distance between the pole shoes. Preferably, the slide valve is made of a magnetically soft material, the slide valve together with the rings forming an integral turned part. In this way, all of the rings are magnetically connected to one another.

In FIG. 2, the slide valve 25 and the exciter coils are so designed that the pole shoes 30 and 31 of the individual coil cores or coil formers 21, 22, 23 are spaced twice the distance between two neighboring rings of the slide valve 25. To fill the sleeve in the upper region above the uppermost exciter coil 23, a filler ring 24 is provided, preferably made of plastic (FIG. 1). To space the individual coil formers of the coil formers 21, 22, 23 from one another, washer-type magnetically insulating spacers 28 and 29 are provided therebetween, which thus serve for the rigorous separation of the magnetic excitation and, thus, of the magnetic field lines within two neighboring coil formers. In the example shown in FIG. 2, the thickness of these spacers 28, 29 equals the thickness of one ring which, in turn, preferably equals the thickness of the pole shoes 30, 31.

The operating principle of the shock absorber incorporating the invention will be described below:

FIGs. 1 and 2 both show the slide valve 25 in its fully open position, so that the lower edge of the slide valve 25 just opens the orifice 27 completely. Toward this end, the exciter coil 42 is energized, so that magnetic field lines 50 are produced between the pole shoes 30, 31 and the rings 32, 34, as shown in FIG. 2. Thus, the slide valve 25 is held in this position as long as the exciter coil 42 remains energized. Now, if the exciter coil 43 is energized and the coil 42 disconnected, the slide valve 25 moves downwards one step, which corresponds to the thickness of one ring, so that the rings 35 and 37 face the pole shoes of the coil former 22. At the same time, the rings 38 and 40 have approached the pole shoes of the coil former 23 to within one step. Now, if in the next step the exciter coil 44 is energized and the coil 43 switched off, the slide valve 25 moves another step downwards because of the reduction of the energy in the magnetic field, since the rings 38 and 40 now face the pole shoes of the coil former 23. In the next step, the exciter coil 42 of the coil former 21 is again energized and the coil 44 turned off. As a result, the rings 33 and 35 find their way to the immediate area of the pole shoe of the coil former 21. To carry out the last step, the exciter coil 44 of the coil former 23 is again energized and the previously excited coil turned off. Thereby, the rings 39 and 41 migrate to the area of the pole shoes of the coil former 23, causing the slide valve 25 to complete its downward travel and the orifice 27 to be fully closed. To lift the slide valve 25, this procedure is reversed, i.e., starting with the energization of the exciter coil 43 of the coil former 22, followed by the energization of the exciter coil 42 of the coil former 21, then of the coil 44, then of the coil 43 and, finally, of the coil 42.

Should the electrical power supply fail, the shock absorber then has the advantage that the slide valve is urged to the closed position by means of a spring 52 as shown in FIG. 1. This is the rest position of the slide valve.

Preferably, the regulation or control circuit 46 has a microcomputer and/or microprocessor which generates all the control signals in the shock absorber, such as acceleration by means of an acceleration sensor 49 and travel of the shock absorber by means of a distance transducer. The signals trigger the exciter coils according to the computed damping values so as to adjust the level of the slide valve 25. In this way, the slide valve can be properly adjusted to cope with the immediate situation concerned.

The power supply for the regulation or control circuit 46 can be provided from an external source via a supply lead 47 as shown in FIG. 1. Likewise, an internal energy source can be provided within the shock absorber, e.g., a soft-iron core with an exciter coil, past which a magnet moves. The voltage induced in the wire winding then serves as an internal power supply for the regulation or control circuit. Also, other signals, e.g., the engine speed, can be routed to the control circuit 46 from an external source.

In a preferred embodiment, the lower portion 53 of the piston rod 3 can be made of non-magnetic material, e.g., brass. The spacers 28 and 29 can also be made of non-magnetic material.

The shock absorber embodying the invention can be designed as a single-tube or twin-tube shock absorber known from the prior art. In the latter case, at least one more valve is provided on the piston end of the internal cylinder tube through which damping fluid can flow into the external cylinder. In this case, the gas cushion for pressure equalization is located in the outer cylinder, if a system with a fluid damping medium is employed.

Figure 3B:
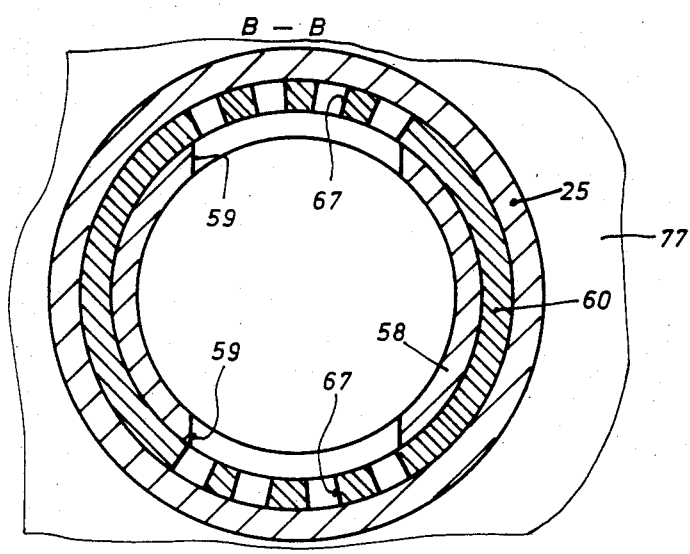
FIG. 3B is a cross-sectional view taken along the line B—B in FIG. 3A.
Figure 3A:
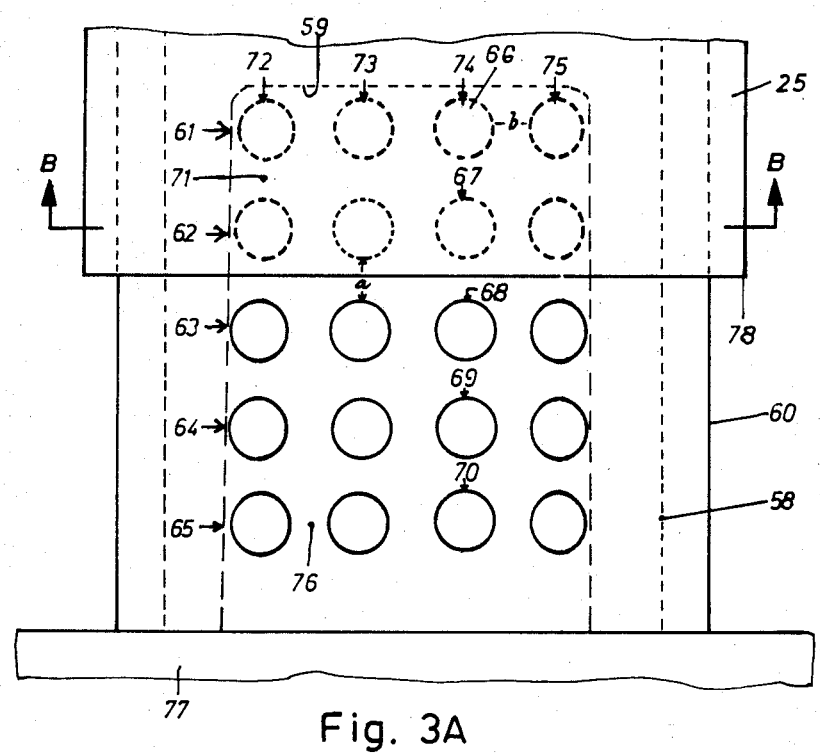
FIG. 3A is a top plan view of another sleeve for the shock absorber of the invention which covers the orifices in the piston rod and which, in the areas of the orifices in the piston rod, is provided with transverse and longitudinal rows of holes.

FIG. 3A is a top plan view showing another type of sleeve 60 for the invention with the lower end of a piston rod 58 above a piston 77. FIG. 3B is a cross-sectional view taken along the line B—B in FIG. 3B. In this embodiment, the piston rod 58 has one or more orifices 59, preferably in the form of slots. In the case of the lifting valve shown in FIG. 1, these slots preferably run parallel to the longitudinal axis of the piston rod.

A tubular sleeve 60, either locked through its shape or pressure-locked on the piston rod, is slipped onto piston rod 58. This sleeve 60 has, in the area of the orifice or orifices 59 of the piston rod 58, holes 66, 67, 68, 69, 70 preferably arranged in cross rows 61, 62, 63, 64, 65 or in longitudinal rows 72, 73, 74, 75. Between the individual cross rows there remains a material bridge 71 having a width a. The lifting valve 25 is mounted with allowance for sliding up and down sleeve 60. Therefore, this sleeve is preferably made of an antimagnetic material, e.g., brass.

When the lifting slide valve 25 moves in accordance with its single steps, the lower boundary edge 78 remains inside each material bridge 71 between the particular cross rows 61–65 concerned and, for example, still above the cross row 61. Thus, the damping medium flowing through the orifice 59 and the opened holes (in FIG. 3A, the holes of the rows 63, 64 and 65) cannot transmit any force or moment to the lifting valve 25 because of the velocity of flow. Since, as a rule, the orifices 59 are distributed radially symmetrically on the piston rod 58, the holes as well are radially symmetrically distributed within the wall of the sleeve 60. Thus, the damping fluid in the covered holes in this example the holes of the cross rows 61 and 62, apply no moments of motion to the lifting valve 25.

Moreover, by selecting another fixed sleeve 60 with differently sized holes in the area of the orifice or orifices in the piston rod, the attenuation curve of the shock absorber incorporating the invention can be advantageously predetermined, for example, according to the chosen application of the shock absorber for passenger cars or trucks.

Advantageously, such a fixed sleeve with holes in the area of the orifice or orifices in the piston rod can also be employed for a shock absorber with a rotary valve, as explained in greater detail with reference to FIGS. 4, 5 and 6. In this case, the holes 66, 67, 68, 69 and 70 are preferably provided in longitudinal rows 73, 74, 75, as shown in FIG. 3A. Between the individual holes of each longitudinal row there remains a material bridge 76 having a width b.

With regard to the operating principle, it should be noted that in this case the rotary valve has an orifice or orifices that register with the orifice or orifices in the piston rod, so that the leading edge of the opening of the rotary valve, i.e., the particular closing or opening edge of opening, comes to rest inside the material bridge 77 at every step of the rotary valve.

Figure 4:
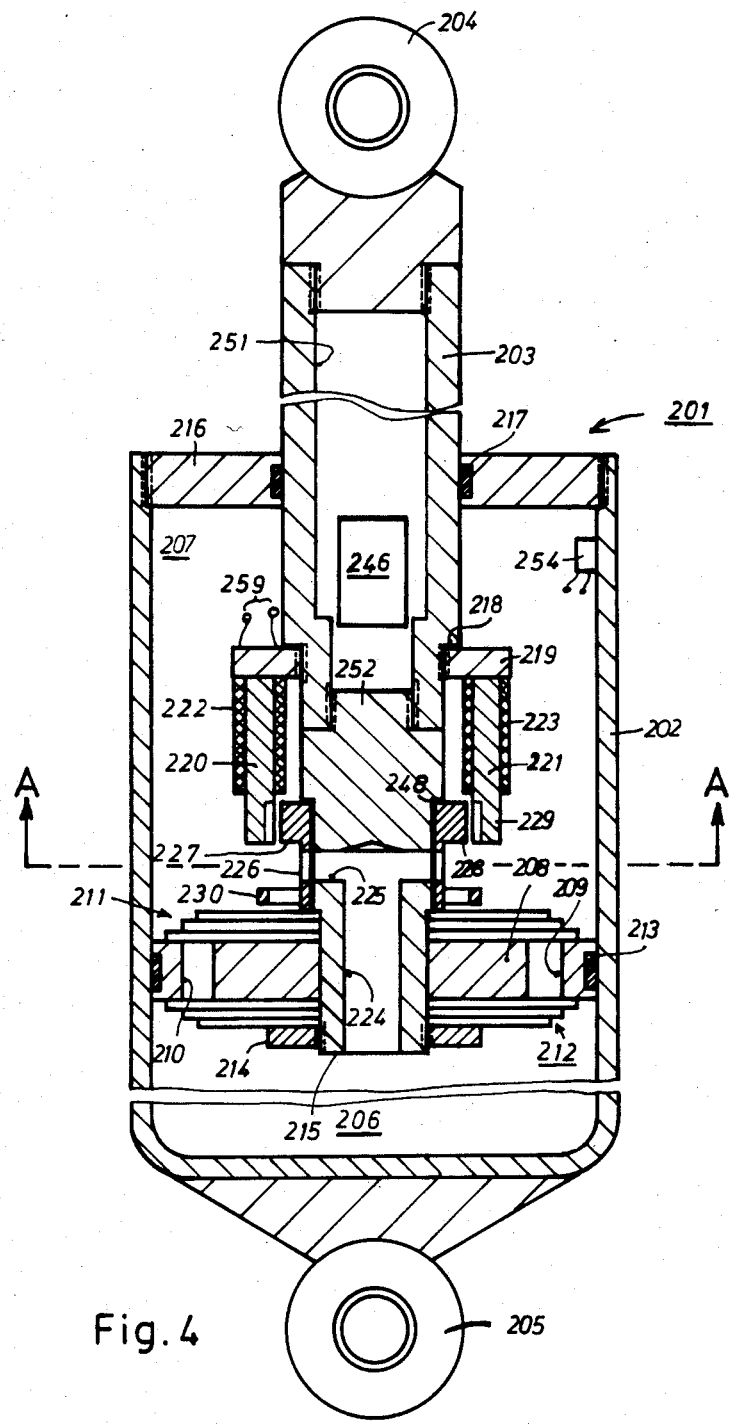
FIG. 4 is a cross-sectional view through another embodiment of the invention of a shock absorber provided with a rotary valve.
Figure 5:
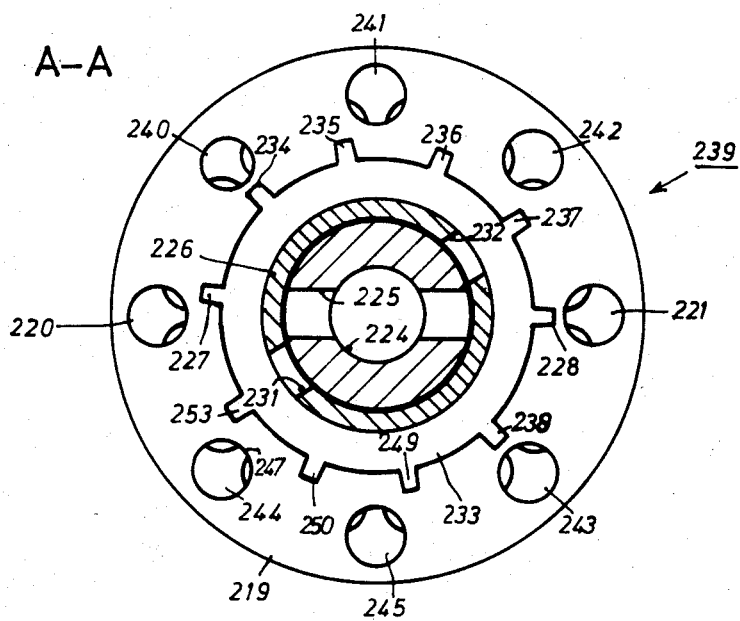
FIG. 5 is a top plan view taken along the line A—A in FIG. 4, in which the exciter coils of the coil formers have been omitted.

FIGS. 4 and 5 show a shock absorber embodying the invention having a rotary valve. In this embodiment, the shock absorber comprises a shock absorber 201 with a cylinder 202 closed at both ends. The design of the piston-cylinder system corresponds to that of FIGS. 1 and 2, so that reference is made to this description. The upper end of the cylinder is closed by a cylinder cover 216, a piston rod 203 extending through cover 216 into the cylinder 202 and the rod 203 and cover 216 being sealed by means of a seal ring 217. Holding fixtures 204, 205 are fastened, respectively, to the upper end of the piston rod and the lower end of the cylinder so as to attach the shock absorber 201, on the one hand, to the car body and to the wheel or axle of the vehicle, on the other. The piston rod is partially hollow and has a longitudinal bore 251, into the lower end of which an end piece 252 is screwed.

The piston 208 can be a common piston, such as known in the shock absorber art, wherein the piston 208 has throughbores 209 and 210 which are covered by means of compound springs 211 and 212. The piston 208 divides the internal cylinder space into a lower half-chamber 206 and an upper half chamber 207 so that in the embodiment illustrated in FIG. 4, they communicate with each other via the throughbores 209 and 210.

The piston rod 203 can have the aforementioned end piece 252 screwed thereinto and on which the piston 208 is mounted. Starting from the front side of the end piece 252, the lower end 215 of the piston rod 203 or the end piece 252 has a longitudinal bore 224 that runs concentrically with the longitudinal axis of the piston rod 203 and extends through the piston 208. Perpendicular to longitudinal bore 224, the end piece 252 or the piston rod 203 has orifices above the piston 208 which traverse the longitudinal bore 224 radially. The number of such orifices can be even or odd, and they are preferably arranged radially symmetrically. FIGS. 4 and 5 show two orifices which, in this case, form a throughbore 225 along a diameter. In this way, the bores 224 and 225 link the half chambers 206 and 207 with each other, thereby creating a bypass if the piston 208, as preferred, is used with high- and low-pressure valves.

The piston rod 203 has, in the area of the upper half chamber 207, magnets or coil formers 220, 221, 240, 241, 242, 243, 244 and 245 which preferably take the form of a rod and extend parallel to the longitudinal axis of the piston rod. Thus, the coil formers have an annular configuration about the piston rod and are fixedly attached to the piston rod. Each of the coil formers has an exciter coils 222, 223 for the purpose of generating a magnetic flux within the coil former or coil formers that may be triggered at any one time.

As an example, the coil formers depicted in FIG. 5 are mounted on a disk 219 spaced an equal distance from one another, the disk 219 having a concentric bore through which the piston rod 203 is passed. To this end, the piston rod has a peripheral shoulder 208 with threads in the smaller-diameter area, the disk 219 being screwed onto the smaller-diameter end piece of the piston rod 203, as shown in FIG. 4. In this way, the coil formers are firmly attached to the piston rod 203.

Above the piston rod 208 a rotary valve 226 is mounted on the lower end of the piston rod 203 coaxially about the latter in the area of the cross bore 225. This rotary valve takes the form of a cylindrical sleeve and it also has two throughbores 231 and 232 (FIG. 5), which can be made to register with the cross bore 225 when the slide valve assumes a given position. To hold the rotary valve 226 in place, the piston rod 203 or the end piece 252 can have within the piston rod another peripheral shoulder 248 at the level of the rotary valve. The upper end of the rotary valve 226 has a specified number of lifters or teeth 227, 228, 234, 235, 236, 237, 238, 249, 250 and 253 which, directly and at one side, face the pole shoes 247 of the coil formers. The lower ends of the coil formers therefore rise above or overlap the lifters of the rotary valve. Thus, the coil formers or magnets, together with the exciter coils mounted thereon, from an external stator 239 of a step motor, the rotary valve 226 with the lifters forming the internal rotor, and the lifters, in turn, forming the pole shoes of the rotor. As an example, in FIG. 4, the magnetic circuit is closed via the coil former 220, the lifter 227 of the rotary valve 226, the lifter 228 of the rotary valve, the oppositely excited magnet 229, and the retaining disk 219 made of magnetizable material. The lifters of the rotary valve, preferably those lying in pairs opposite each other, are short-circuited magnetically with one another.

The coil formers are made of magnetic materials of high permeabilities known from the prior art. In certain applications, the magnets can also be permanent magnets whose magnetization can be enhanced by the exciter coils when current flows. The step motor can also be so designed that the rotary valve is an external rotor surrounding both the piston rod and the magnets. In this case, the magnets, together with the exciter coils, are constructed as an internal stator. Forms of construction are also possible in which the magnets are arranged not parallel to the piston rod but, for example, radially thereto. The single important point is that the mechanism of motion for the rotary valve be designed in such a way that the latter can be rotated in a required pattern by stepwise triggering to close the cross bore inside the piston rod to the desired degree.

FIG. 5 is a cross-sectional view taken along the line A—A in FIG. 4, with the stepping drive in this case consisting of eight magnets spaced an equal distance from one another about the piston rod. The rotary valve 226 is designed for four steps. Preferably, the opposed magnets are excited magnetically in opposite directions, so that the magnetic circuit is closed via the magnets facing each other in pairs.

As an example, in FIG. 5 at step zero, the opposed lifters 234, 238 face the pole shoes of the magnets 240, 243 likewise mounted in pairs. The next lifter 235 on the disk is one step before the magnet 241. At step one, the magnet 241, for example, is excited and the magnet 245 opposite thereto is excited magnetically in opposite directions. As a result, the lifter 235 migrates to the immediate area of the pole shoe of the magnet 241, so that the next lifter 236 is now one step before the next magnet 242. At step two, the magnet 242 (and the opposite magnet 244) is excited, so that the lifter 236 directly faces the pole shoe of the magnet 242. The next lifter 237 is now one step before the next magnet 221. At step three, the magnet 221 (and the opposite magnet 220) is excited, so that the lifter 237 directly facing the pole shoe of the magnet 221 (and the opposite lifter likewise facing the magnet 220) is moved. In this way, when the magnets are triggered by the control circuit, the row of magnets will always pass through upwards and downwards.

The control mechanism can, of course, also be provided with a greater or lesser number of magnets. The number of steps of the rotary valve can be properly adapted to the desired conditions.

Where necessary, an acceleration sensor 254 can also be provided in the cylinder interior, preferably in the half chamber in which the control circuit 248 is also located.

With the shock absorber incorporating the invention designed both with a lifting valve and with a rotary valve, it is unnecessary—though possible—to introduce from outside the shock absorber into the control circuit, control variables such as vehicle velocity, acceleration, or engine speed. All that is necessary is the input of travel data that can also be acquired within the shock absorber, because what is of prime importance is only the rapid change of the flow section and, thus, the quick change of the step motor. If the step motor responds before the maximum oscillations of about 10 to 12 Hz occurring in a shock absorber for motor vehicles become effective at all, one can dispense with the input or processing of vehicle-speed, engine-speed or acceleration signals, and process only as the control signal a distance-sensitive signal which is proportional to the relative movement of the piston with respect to the cylinder or of the movement of the wheel with respect to the vehicle body. In this case, one is concerned with a true, self-adjusting shock absorber, to which only the supply voltage must be fed from an external source. Therefore, in a motor vehicle all four shock absorbers can be adjusted automatically and independently of each other.

An acceleration sensor is only necessary at higher frequencies, for example, only from 100 Hz onward, if the shock absorber taught by the invention is employed not for motor vehicles, but for damping oscillations in rapidly oscillating machines or assemblies of equipment.

However, each shock absorber can, independently of the other shock absorbers, calculate the optimum damping in accordance with the requirements in each case, e.g., road conditions, and adjust the rotary valve accordingly. Thus, except for the voltage supply, all of the components are integrated within the shock absorber proper.

Therefore, the use of the conventional piston with high- and lower-pressure valves is advantageous, because if the automatic control breaks down, the shock absorber will continue to perform its damping action within the required limits.

Preferably, the control circuit has a microcomputer and/or a microprocessor which processes all the control signals: vehicle speed, acceleration, engine sped and shock-absorber travel, and triggers the magnets of the stator accordingly. As a result, the rotary valve is properly adjusted to the immediate situation.

In the preferred embodiment shown in FIGS. 4 and 5, the torsion spring 250 is particularly designed to rotate the rotary valve to its closed position if the automatic electric control fails. This establishes communication between the two half chambers through the longitudinal bore 224 and the cross bore 225, thereby activating the valves in the piston so that the shocker absorber continues to be fully operational, but within the required limits.

Figure 6:
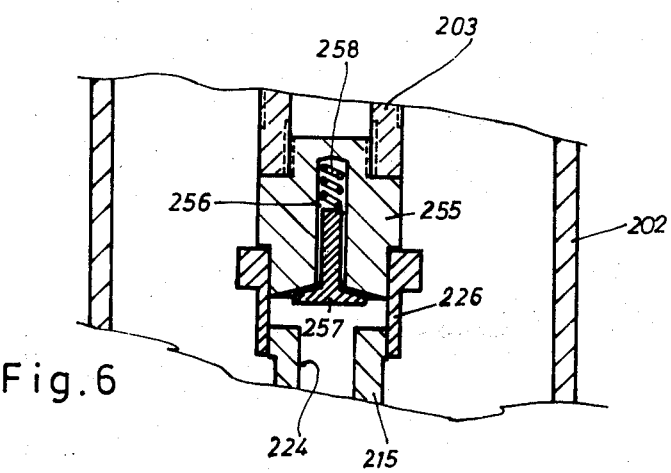
FIG. 6 is a partial sectional view through another piston rod having in the area of the orifices a valve for closing the orifices in a given direction.

FIG. 6 shows another preferred embodiment of a self-adjusting shock absorber as depicted in FIG. 4, of which only the end portion of the piston rod is constructed differently from the shock absorber illustrated in FIG. 4.

On the piston rod there is mounted an end piece 255 having a central blind hole 256 and preferably screwed thereinto. A valve 257 is disposed within this blind hole, the end portion of which can accommodate a pressure spring 258 which moves the valve 257 in a given direction in order to close the orifice of the longitudinal bore within the lower end 215 of the piston rod.

If the attenuation response is positive, that is, if there is an incident flow against the disk of the valve 257, the latter is opened from below. When the shock absorber swings out, that is, if, with the rotary valve fully open, the damping medium wants to return from the chamber 206 to the chamber 207 through the openings 231, 232 of the rotary valve 226, the bore 225, and the longitudinal bore 224 of the piston, the valve 257 will be moved downwards by the flowing medium and/or by the pressure spring 258 and will abruptly shut off the orifice of the longitudinal bore 224. This causes the rotary valve to assume its fully open position. The dying-out process can only occur through the valves 209 and 210 inside the piston (FIG. 4). Should anything happen during the dying-out process, that is, if the attenuation response is negative before the dying-out process has reached its zero line, then the rotary valve is immediately adjusted according to the computed value. For example, this situation can occur if the wheel is abruptly moved towards the vehicle body so that the attenuation response again becomes positive Since the valve 257 is lifted by the damping medium, the bypass is cleared again and a new transient process can follow the previous, not fully completed, dying-out process.

To determine the piston rod travel with respect to the cylinder, the cylinder can be provided with a measuring section in the inner wall throughout the length thereof, and a magnetic or capacitive sensor can be mounted within the piston rod to scan the measuring section. The sensor faces the latter measuring section directly and is electrically connected to the control circuit. The easiest way to obtain a travel-sensitive measuring signal is by means of a thread within the inner wall of a cylinder, a capacitive or magnetic sensor facing the thread being mounted on the piston rod.

Both embodiments of the shock absorber taught by the invention, i.e., either with a lifting or with a rotary valve, can be used to obtain a travel-sensitive measuring signal.

Figure 7:
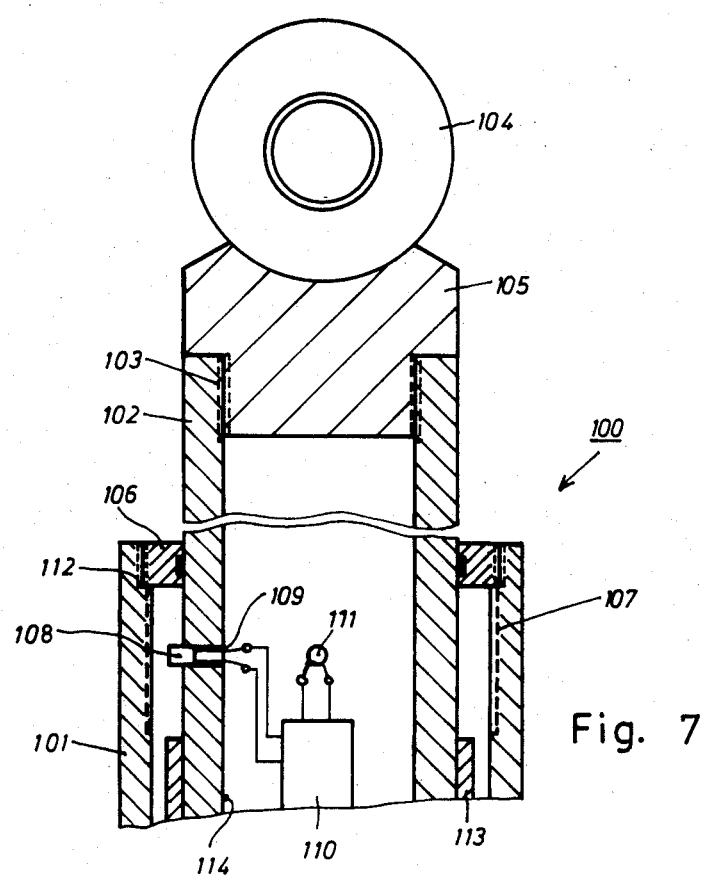
FIG. 7 is a partial longitudinal sectional view through the upper portion of a shock absorber to show a distance transducer.

FIG. 7 depicts a shock absorber 100 which, for its automatic adjustment according to the teachings of the invention, has a measuring section for determining the travel of the cylinder relative to the piston rod. The shock absorber 100 is comprised of a cylinder 101, into which dips a piston rod 102. Preferably, the piston rod is tubular and has at its upper end an internal thread 103, into which is screwed a connecting piece 105 having a holding fixture 104 for mounting the shock absorber, for example, on the wheel of a motor vehicle. The cylinder 101 is closed on its upper end by means of a cylinder cover 105 through which the piston rod 103 dips into the cylinder. Preferably, the cylinder cover 106 is screwed by means of a thread into a thread 112 in the uppermost portion of the cylinder 101.

Figure 8:
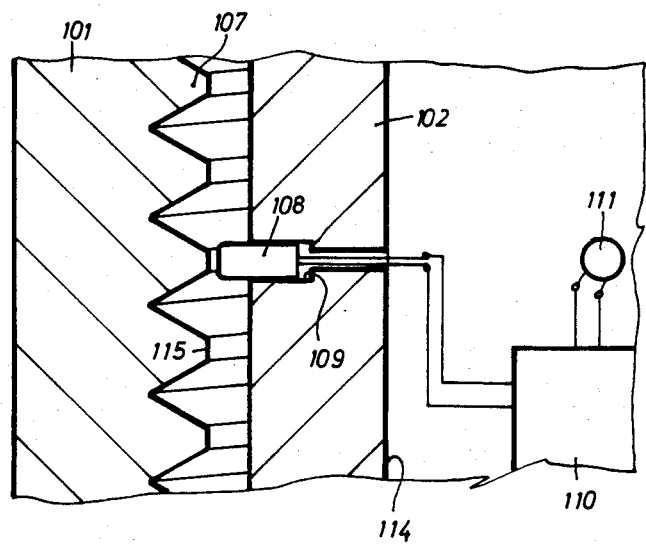
FIG. 8 is a distance-measuring sectional view made up of a trapezoidal thread within the cylinder and a Hall sensor within the piston rod.

There is disposed within the cylinder in the direction of its axis and on its inner wall a measuring section 107 which, as shown in FIG. 8, is preferably a trapezoidal thread 115. This measuring section 107 or trapezoidal thread 115 faces a sensing element 108 which, in this case, is preferably a magnetic or capacitive sensor. Sensor 108 is located in a bore 109 in the wall of the piston rod 102 and directly faces the measuring section 107 or the trapezoidal thread 115. Preferably, the sensing element 108 is a Hall sensor or Hall generator. As illustrated in FIG. 8, two Hall generators or Hall sensors 108 and 111 can be provided for directional differentiation to determine the up-and-down movement of the piston rod with respect to the cylinder.

Within the bore 114 in the piston rod 102 there is disposed a control circuit 110 to which the Hall generators 108 and 111 are connected.

A breakdown voltage guard is denoted by the reference numeral 113 in FIG. 7.

When the piston rod 102 moves with respect to the cylinder 101, the sensors 108 and 111 rub against the measuring section 107 or the trapezoidal thread 115. Each elevation across which the Hall generators 108 and 111 are moved produces an output pulse which is counted inside the counting circuit, thereby generating a signal that is proportional to the distance.

Therefore, the design of the measuring section as a thread or also as permanent magnets spaced an equal distance from the inner cylinder wall produces a signal consisting of a plurality of digital pulses equal in number to the number of the threads swept by the sensor 108, 111 or by the magnets moving past. The single pulses of this digital signal are counted in a counting circuit of the control circuit 110. At the same time, the time difference between every two successive pulses is measured continually. From the acceleration determined in this manner, the expected amplitude can be computed and this value is used to trigger the distributing slide valve, which is now properly adjusted in steps.

LIST OF REFERENCE NUMERALS

| | |
|---|---|
| 1 | shock absorber |
| 2 | cylinder |
| 3 | piston rod |
| 4, 5 | holding fixtures |
| 6 | lower half chamber |
| 7 | upper half chamber |
| 8 | piston |
| 9, 10 | valve bores |
| 11,12 | valve springs |
| 13 | ring seal |
| 14 | nut |
| 15 | lower end of piston rod |
| 16 | cylinder cover |
| 17 | ring seal |
| 18 | shoulder |
| 19 | disk |
| 20 | sleeve |
| 21, 22,23 | toroidal coil formers |
| 24 | filler ring |
| 25 | slide valve |
| 26 | longitudinal bore |
| 27 | cross bore |
| 28, 29 | magnetically isolating spacers |
| 30,31 | disk-shaped pole shoes |
| 32-34 | rings |
| 42, 43,44 | exciter coils |
| 45 | double arrow indicating direction of movement |
| 46 | control circuit |
| 47 | connector for power supply |
| 48 | bore in piston rod |
| 49 | acceleration sensor |
| 50 | magnetic field line |
| 51 | flanged edge |
| 52 | pressure spring |
| 53 | lower portion of piston rod |
| 54 | tubular cylinder |
| 55 | bottom |
| 56 | cover |
| 57 | internal front-end narrow face |
| 58 | piston rod |
| 59 | orifice or slot |
| 60 | fixed sleeve |
| 61-65 | cross rows of holes |
| 66-70 | single holes |
| 71 | material bridge with width a |
| 72-75 | longitudinal rows of holes |
| 76 | material bridge between longitudinal rows with width b |
| 77 | piston |
| 78 | lower boundary edge of lifting valve25 |
| 100 | shock absorber |
| 101 | cylinder |
| 102 | piston rod |
| 103 | internal thread |
| 104 | holding fixture |
| 105 | connecting piece |
| 106 | cylinder cover |
| 107 | measuring strip |
| 108 | Hall sensor |
| 109 | bore |
| 110 | control circuit |
| 111 | Hall sensor |
| 112 | thread |
| 113 | fusible cut-out |
| 114 | bore |
| 115 | trapezoidal thread as measuring section |
| 201 | shock absorber |
| 202 | cylinder |
| 203 | piston rod |
| 204, 205 | holding fixtures |
| 206 | lower half chamber |
| 207 | upper half chamber |
| 208 | piston |
| 209, 210 | valve bores |
| 211, 212 | valve springs |
| 213 | ring seal |
| 214 | motor |
| 2115 | lower end of piston rod |
| 216 | cylinder cover |
| 217 | ring seal |
| 218 | shoulder |
| 219 | disk |
| 220, 221 | magnets |
| 222, 223 | exciter coils |
| 224 | longitudinal bore |
| 225 | cross bore |
| 226 | rotary valve |
| 227, 228 | lifters |
| 229 | lower end of magnets |
| 230 | torsion spring |
| 231, 232 | bores in rotary valve |
| 233 | disk |

| -continued | |
|---|---|
| 234, 235, 236, 237 | lifters |
| 238, 249, 250, 253 | lifters |
| 239 | stator |
| 240, 241, 242, 243 | magnets |
| 244, 245 | magnets |
| 247 | pole shoe |
| 248 | shoulder |
| 246 | control circuit |
| 251 | bore |
| 252 | end piece |
| 254 | acceleration sensor |
| 255 | end piece |
| 256 | blind hole |
| 257 | valve |
| 258 | pressure spring |
| 259 | exciter-coil connections |

What is claimed is:

1. A self-adjusting tube shock absorber, particularly suitable for motor vehicles, comprising: (a) a cylinder closed at both ends and filled with at least one damping medium; (b) a piston rod sealingly inserted into the cylinder; (c) a piston carried on the cylinder side end of said piston rod, optionally provided with high- and low-pressure valves, packaged against the cylinder wall and dividing the cylinder space into two half chambers, wherein the half chambers are connected by a longitudinal bore formed in the piston rod and at least one orifice traversing the longitudinal bore; (d) an electrically controlled distributing slide valve means for opening and closing the orifice including:
   (i) a slide-valve sleeve coaxially surrounding the piston rod in the area of the orifice and movable on the piston rod for opening and closing the orifice;
   (ii) a step motor provided in said cylinder and having the slide valve as a movable part of step motor for stepwise adjusting the slide valve, and a stator comprising a plurality of exciter coils and coil formers surrounding the slide valve sleeve and the piston rod fixedly therewith; and (iii) electronic control circuit means for supplying electrical switching pulses to the step motor dependent upon the data entered in the control circuit means for the stepwise adjustment of the slide-valve.

2. The shock absorber as set forth in claim 1, wherein the slide-valve sleeve is movable upwards and downwards on the piston rod, and has rings on the outer wall of the sleeve superimposed upon one another in cross-sectional planes, made of a magnetic material, and magnetically connected to one another, and wherein the coil formers are superimposed upon one another in the direction of the piston rod and attached hereto, and have pole shoes spaced a slight distance from the opposite slide-valve sleeve rings.

3. The shock absorber as set forth in claim 2, wherein in order to move the slide-valve sleeve in five steps, said rings comprise ten rings spaced an equal distance from one another and said coil formers comprise three coil formers each provided with two pole shoes, the pole shoes being spaced from each other a distance which is equal to twice the distance between two adjacent rings.

4. The shock absorber as set forth in claim 2, wherein an inner sleeve is provided on the piston rod for covering the orifice or orifices, said inner sleeve being movably fixed onto the piston rod and having holes in the area of the orifice or orifices arranged in cross rows and/or in longitudinal rows, the distributing slide-valve sleeve being movably arranged on said inner sleeve.

5. The shock absorber as set forth in claim 1, wherein the slide-valve sleeve is made of a magnetically soft material, wherein the coil formers are toroidal iron cores surrounding the piston rod and the slide valve in an annular configuration, wherein said slide valve means further comprises a sleeve fixedly connected to the piston rod about the same axis for retaining the iron cores therein and spacers formed of antimagnetic material being interposed between the individual coil formers, and wherein, the piston rod has a lower part in the area of the orifice and of the slide valve sleeve formed of an antimagnetic material.

6. The shock absorber as set forth in claim 1, wherein the slide-valve means is a rotary valve coaxially surrounding the piston rod in the area of the orifice and having a wall with radial openings as many as there are orifices for opening the offices upon rotation of the rotary valve with respect to the piston rod, wherein the coil formers of the step motor stator have the form of a rod, surround the piston rod coaxially, and have upper end retained on the piston rod and arranged about the piston rod in the form of a circle and parallel thereto, and wherein the exciter coils face each other and are triggered one by one or in pairs.

7. The shock absorber as set forth in claim 6, wherein the piston rod has an inside area adjacent the orifices and a spring-loaded, valve is provided in the piston rod inside area for closing the orifices in a given direction.

8. A shock absorber as set forth in claim 6, wherein an inner sleeve is provided on the piston rod for covering the orifice or orifices, said inner sleeve being movably fixed onto the piston rod and having holes in the area of the orifice or orifices arranged in cross rows and/or in longitudinal rows, the distributing slide-valve sleeve being movably arranged on said inner sleeve.

9. The shock absorber as set forth in claim 6, wherein the rotary valve includes a sleeve and magnetizable lifters carried along the periphery of the sleeve, and wherein the coil formers rise above the rotary valve constructed as an internal rotor up to the area of the lifters and are formed as pole shoes.

10. A shock absorber as set forth in claim 9, wherein the piston rod has an inside area adjacent the orifices and a spring-loaded, valve is provided in the piston rod inside area for closing the orifices in a given direction.

11. The shock absorber as set forth in claim 9, wherein the number of lifters carried by the slide-valve sleeve corresponds to the number, or to a multiple thereof, of the steps to be taken by the slide-valve sleeve.

12. A shock absorber as set forth in claim 11, wherein the piston rod has an inside area adjacent the orifices and a spring-loaded, valve is provided in the piston rod inside area for closing the orifices in a given direction.

13. The shock absorber as set forth in claim 1 further comprising a distance transducer means for determining the travel of the piston rod with respect to the cylinder and for generating electrical output signals to said control circuit in accordance with the determined travel, the transducer means having a measuring section in a portion of the cylinder inner wall in the direction of the cylinder axis and a magnetic or capacitive sensor provided within the piston rod for scanning the measuring section, said sensor facing the measuring section and being electrically connected to the control circuit.

14. The shock absorber as set forth in claim 13, wherein the measuring section has alternate elevation and depression areas formed as threads and grooves, and wherein the sensor is a Hall sensor.

15. The shock absorber as set forth in claim 14, wherein two Hall sensors are mounted on the piston rod staggered by 90 degrees.

16. The shock absorber as set forth in claim 1, comprising means for measuring the travel of the cylinder with respect to the piston rod and generating electrical output signals to said control circuit means in accordance with the measured travel, wherein the piston rod is magnetized in sections and the cylinder carries coaxially about the piston rod at least one coil.

17. The shock absorber as set forth in claim 1, wherein the data entered into the control circuit means includes data selected from a group consisting of temperature of the damping medium, viscosity of the damping medium, travel of the piston rod with respect to the shock absorber cylinder, vehicle speed, and acceleration.

18. A shock absorber as set forth in claim 17, further comprising a distance transducer disposed within the shock absorber for measuring the travel of the piston rod with respect to the shock absorber cylinder and for generating electrical output signals to said control circuit means.

19. A shock absorber as set forth in claim 1, wherein said electronic control circuit means is positioned within the cylinder of the shock absorber.

* * * * *